United States Patent [19]
Ai et al.

[11] Patent Number: 5,471,303
[45] Date of Patent: Nov. 28, 1995

[54] COMBINATION OF WHITE-LIGHT SCANNING AND PHASE-SHIFTING INTERFEROMETRY FOR SURFACE PROFILE MEASUREMENTS

[75] Inventors: Chiayu Ai; Paul J. Caber, both of Tucson, Ariz.

[73] Assignee: Wyko Corporation, Tucson, Ariz.

[21] Appl. No.: 247,065

[22] Filed: May 20, 1994

Related U.S. Application Data

[63] Continuation-in-part of Ser. No. 235,105, Apr. 29, 1994.

[51] Int. Cl.[6] .................................................. G01B 11/02
[52] U.S. Cl. ............................................ 356/357; 356/359
[58] Field of Search ...................................... 356/357, 359, 356/360, 349

[56] References Cited

U.S. PATENT DOCUMENTS

| | | | |
|---|---|---|---|
| 3,804,532 | 4/1974 | Patten et al. | 356/357 |
| 4,537,508 | 8/1985 | Doyle | 356/346 |
| 4,555,767 | 11/1985 | Case et al. | 356/381 |
| 4,999,014 | 3/1991 | Gold et al. | 356/382 |
| 5,241,366 | 8/1993 | Bevis et al. | 356/357 |
| 5,285,261 | 2/1994 | Dumoulin | 356/345 |
| 5,333,049 | 7/1994 | Ledger | 356/359 |

OTHER PUBLICATIONS

Caber, "Interferometric Profiler for Rough Surfaces . . . ," Applied Optics, vol. 32 No. 19, pp. 3438–3441, Jul. 1, 1993.
Caber et al., "A New Interferometric Profiler for Smooth and rough Surfaces . . . ," Proc. SPIE, vol. 2088, pp. 195–203, Oct. 1993.
Kino et al., "Mirau Correlation Microscope . . . ", Applied Optics, vol. 29 No. 26, pp. 3775–3783, Sep. 10, 1990.
De Groot et al., "Three–Dimensional Imaging by Sub–Nyquist Sampling of White–Light Interfermetors . . . ," Optics Letters, vol. 18 No. 17, pp. 1462–1464, Sep. 1, 1993.
Danielson, et al., "Absolute Optical Raning Using Low Coherece Inferometry . . . ," Applied Optics, vol. 30 No. 21, pp. 2975–2979, Jul. 20, 1991.
Davidson, et al., "First Results of a Product Utilizing Coherence Probe Imaging for Wafer Inspection . . . ," SPIE, vol. 921, pp. 100–114, 1988.
Dressel et al., "Three–Dimensional Sensing as Rough Surfaces by Coherence Vector . . . ," Applied Optics, vol. 31 No. 7, pp. 919–925, Mar. 1, 1992.

*Primary Examiner*—Samuel A. Turner
*Assistant Examiner*—Jason D. Eisenberg
*Attorney, Agent, or Firm*—Antonio E. Durando

[57] ABSTRACT

Interferometric apparatus that combines white-light VSI and single-wavelength PSI capabilities to improve the accuracy of height measurements in steep regions and in areas with large inter-pixel steps on the test surface. The technique consists of performing VSI measurements to obtain a relatively coarse profile of the test surface and to identify regions separated by a large step. Then PSI measurements are carried out over the test surface to obtain a relatively fine profile. Offsets between VSI and PSI measurements are calculated to correct for misalignments and phase shifts that may have occurred between the two sets of measurements. Finally, the fine PSI data are integrated to within one quarter wavelength of the coarse VSI data. The resulting quality of the height data in each of the step regions is thus improved to within the resolution of the PSI measurements.

15 Claims, 12 Drawing Sheets

Carry out VSI measurements to generate $h_{VSI}(x,y)$

↓

Carry out PSI measurements to generate $\phi_{PSI}(x,y)$

↓

Integrate $\phi_{PSI}(x,y)$ by calculating $h_{VSI+PSI}(x,y)$ such that $|h_{VSI+PSI}(x,y) - h_{VSI}(x,y)| < \lambda/4$

FIG. 9

COMBINATION OF WHITE-LIGHT SCANNING AND PHASE-SHIFTING INTERFEROMETRY FOR SURFACE PROFILE MEASUREMENTS

RELATED APPLICATIONS

This is a continuation-in-part application of U.S. Ser. No. 08/235,105, entitled Motorized Scanning for Interferometric Measurements, filed on Apr. 29, 1994.

BACKGROUND OF THE INVENTION

1. Field of the Invention

This invention is related in general to the field of phase-shifting interferometry (PSI) and, in particular, to a novel approach to the solution of the phase-ambiguity problem inherent with PSI measurements.

2. Description of the Related Art

The benefits of optical surface profilometry include the ability to perform non-contact measurements of delicate surfaces, excellent height resolution, and high measurement speed. Among the various techniques that have evolved for optical testing, phase-shifting interferometry is an important tool that is used to obtain fast, three-dimensional profiles of smooth surfaces. It is founded on the basic concept of varying the phase difference between two coherent interfering beams of single wavelength in some known manner, such as by changing the optical path difference (OPD) in discrete steps or linearly with time. Under such conditions, three or more measurements of the light intensity at a pixel of a receiving sensor array can be used to determine the initial phase difference of the light beams at the point on a test surface corresponding to that pixel. Based on such measurements at each pixel of coordinates x and y, a phase distribution map $\phi(x,y)$ can be determined for the test surface, from which very accurate height data $h(x,y)$ are calculated in relation to the wavelength $\lambda$ of the light source used by the following general equation:

$$h(x,y) = \frac{\lambda}{4\pi} \phi(x,y). \tag{1}$$

Phase-shifting interferometry provides a vertical resolution on the order of 1/100 of a wavelength or better. Therefore, the technique is typically limited to measurements of smooth, polished, homogeneous surfaces.

When measurements of rougher surfaces, or surfaces with dissimilar optical properties, are made, severe errors can arise. As well understood by those skilled in the art, PSI measurements are very precise and the corresponding height calculations are very reliable so long as the surface height varies by incremental steps less than ¼ of the wavelength $\lambda$ between adjacent pixels; that is, the phase must not change by more than $\pi$, or $\lambda/2$ in the optical path difference, between two adjacent pixels. The phase data are integrated horizontally in conventional fashion by adding or subtracting $2\pi$ to ensure that the absolute value of the phase difference between any pair of adjacent pixels is less than $\pi$. If large vertical steps exist (corresponding to an inter-pixel height difference greater than one quarter wavelength), phase-integration errors of multiples of $2\pi$ in magnitude (known as $2\pi$ ambiguities) result in the integrated-phase map $\phi(x,y)$ generated for the surface and, correspondingly, in the calculated height map $h(x,y)$. Since practical hardware considerations, such as detector array cost and sensitivity, limit the useful range of wavelengths available for phase shifting to about 400 to 700 nm, it is readily apparent that large-step height measurements require additional processing of the raw phase data to remove phase ambiguities between adjacent pixels.

Note that the term horizontal integration is used herein to refer to integration steps taken to correct phase ambiguities between adjacent pixels. On the other hand, the term vertical integration is used to refer to steps taken to correct phase ambiguities present in determining the height of an individual pixel with respect to an approximate value calculated by a coarser procedure.

Because phase shifting allows very accurate measurements with high resolution, which are not attainable by any other known technique, much work has been done to overcome the problem of phase ambiguity in order to utilize the procedure to measure steep surfaces with relatively large inter-pixel step heights. A theoretical technique for overcoming the problem is based on the concept of performing phase shifting with a long wavelength $\lambda_L$, greater than four times the maximum step to be measured between adjacent pixels, and then repeating the measurements with a relatively shorter wavelength $\lambda_S$, as needed for the required degree of resolution. Thus, the phase distribution map generated with $\lambda_L$ is free of ambiguities and can be used to establish a coarse map of the relative height of each test-surface area corresponding to a pixel in the sensor array. The finer-resolution measurements generated with $\lambda_S$ are then superimposed over the coarse data to generate a refined map free of $2\pi$ ambiguities.

In practice, though, the cost of combining available sensor technology in a single instrument to perform phase shifting with a large spectrum of monochromatic light sources (such as infrared, visible and ultraviolet) is prohibitive for commercial applications. On the other hand, charge-coupled-device (CCD) cells are relatively inexpensive and have become the preferred detector for PSI applications because of their speed of response and accuracy for carrying out on-line measurements of intensity. CCD arrays' typical wavelength range of operation is from approximately 400 nm to about 1,000 nm. Therefore, for the purpose of measuring large steps in surface height, such as inter-pixel discontinuities in the order of 400 nm, which would require coarse measurements with a wavelength greater than 1,600 nm (i.e., in the infrared spectrum), a CCD detector alone is not suitable and the two wavelength technique does not provide a viable solution to the phase ambiguity problem. Therefore, artificial devices need to be utilized to overcome these limitations.

In U.S. Pat. No. 4,832,489 (1989), hereby incorporated by reference, Wyant et al. describe a two-wavelength phase shifting technique wherein two relatively short wavelengths, both within the range of operation of the sensor array, are used in combination to generate phase data corresponding to a synthesized, equivalent, longer wavelength. Thus, a coarse map of the sample surface is produced with such equivalent wavelength and these data are then combined with height measurements derived from single-wavelength phase shifting to produce a corrected height map. While a great improvement over previous procedures used to measure relatively large steps, the two-wavelength technique requires two beams of single-wavelength (quasimonochromatic) light dedicated to phase shifting. In addition, the technique is still limited by the fact that the maximum equivalent wavelength feasible by this technique is only about ten times the length of the longer single wavelength used; if a longer equivalent wavelength is synthesized, the system noise becomes too great for reliable results. Therefore, the maximum surface-height step effectively measurable by this technique is still limited to about ¹⁰⁄₄ of the longer wavelength utilized in the procedure. In practice, this constitutes only a ten-fold improvement over single-wavelength phase-shifting and is not adequate for large inter-pixel steps.

Thus, in practice conventional PSI has been limited to measurements of fairly smooth, continuous surfaces; and large-step and steep-surface measurements have been carried out by white-light or broad-bandwidth-light vertical scanning interferometry (VSI), a well-known technique detailed in the prior art (see Caber, Paul J., "Interferometric Profiler for Rough Surfaces," Applied Optics, 32(11):3438–3441, 1993, incorporated herein by reference). As VSI is implemented in the Caber reference, for example, white light is used as the interferometer light source and the degree of fringe modulation, or coherence, of the interference fringes (instead of their phase) produced at the light detector is measured for various distances between a test surface and the reference surface of the interferometer (each distance corresponding to a different optical path difference, OPD) in order to determine surface height. The method typically involves vertical scanning of the reference arm of the interferometer with respect to a stationary sample and calculation of the relative modulation of the intensity signal as a function of vertical position. Such VSI techniques have been used successfully in overcoming the limitations of surface height measurements encountered in conventional phase-shifting interferometry, but are not as precise because of VSI's much lower resolution in comparison to single-wavelength phase shifting.

As vertical scanning interferometry becomes a preferred method for measuring rough surface heights (that is, surfaces with steep gradients or with discontinuities), especially with the expanded range of operation made possible by the motorized translators described in the referenced companion application, it would be very desirable to improve the vertical resolution of the VSI procedure. In addition, because the motorized hardware required for VSI can be combined with phase-shifting hardware, as also demonstrated in the companion application, the concept of combining the two procedures to improve the shortcomings of both appears to be a natural step in the normal evolution of interferometric technology. Therefore, this invention is directed at providing a method and apparatus for combining white-light vertical scanning and phase shifting to make very precise measurements of large steps and steep gradients in the height map of a test surface.

BRIEF SUMMARY OF THE INVENTION

One primary objective of this invention is a method of combining white-light vertical scanning interferometry with phase-shifting interferometry to eliminate $2\pi$ ambiguities from the PSI procedure.

Another important goal of the invention is a method that improves the resolution of white-light vertical scanning, and apparatus capable of producing measurements with an accuracy heretofore available only with single-wavelength interferometry.

Yet another goal is a method and apparatus that produce precise and reliable height measurements over larger inter-pixel steps than previously possible.

Another objective of the invention is a method and apparatus that combine VSI and PSI in a single instrument, whereby providing the capability of profiling an extremely wide range of surface heights.

Another goal of the invention is a technique that is accurate and repeatable, with demonstrable correlation between the two measurement modes.

Still another objective is an apparatus that enables a user to perform VSI, PSI and combined measurements on a test surface with the same instrument.

A final objective is a method of implementation of the concept of the present invention in an instrument that can be manufactured economically by combining both functions in a single instrument.

Therefore, according to these and other objectives, the present invention consists of an interferometer that combines white-light VSI and single-wavelength PSI capabilities to improve the accuracy of height measurements in steep regions and in areas with large inter-pixel steps on the test surface. The technique consists of performing VSI measurements to obtain a relatively coarse profile of the test surface and to identify regions separated by a large step. Then PSI measurements are carried out over the test surface to obtain a relatively fine profile. Offsets between VSI and PSI measurements are calculated to correct for slight displacements and phase shifts that may have occurred between the two sets of measurements. Finally, the fine PSI data are integrated vertically to within one quarter wavelength of the coarse VSI data. The resulting quality of the height data in each of the step regions is thus improved to within the resolution of the PSI measurements.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 8 is a schematic representation of the embodiment of

FIG. 7 wherein the scanning mechanism consists of a motorized device in series with a conventional piezoelectric element.

FIG. 9 is a block diagram of the basic steps according to the method of this invention.

DESCRIPTION OF THE PREFERRED EMBODIMENTS OF THE INVENTION

Figure 1:
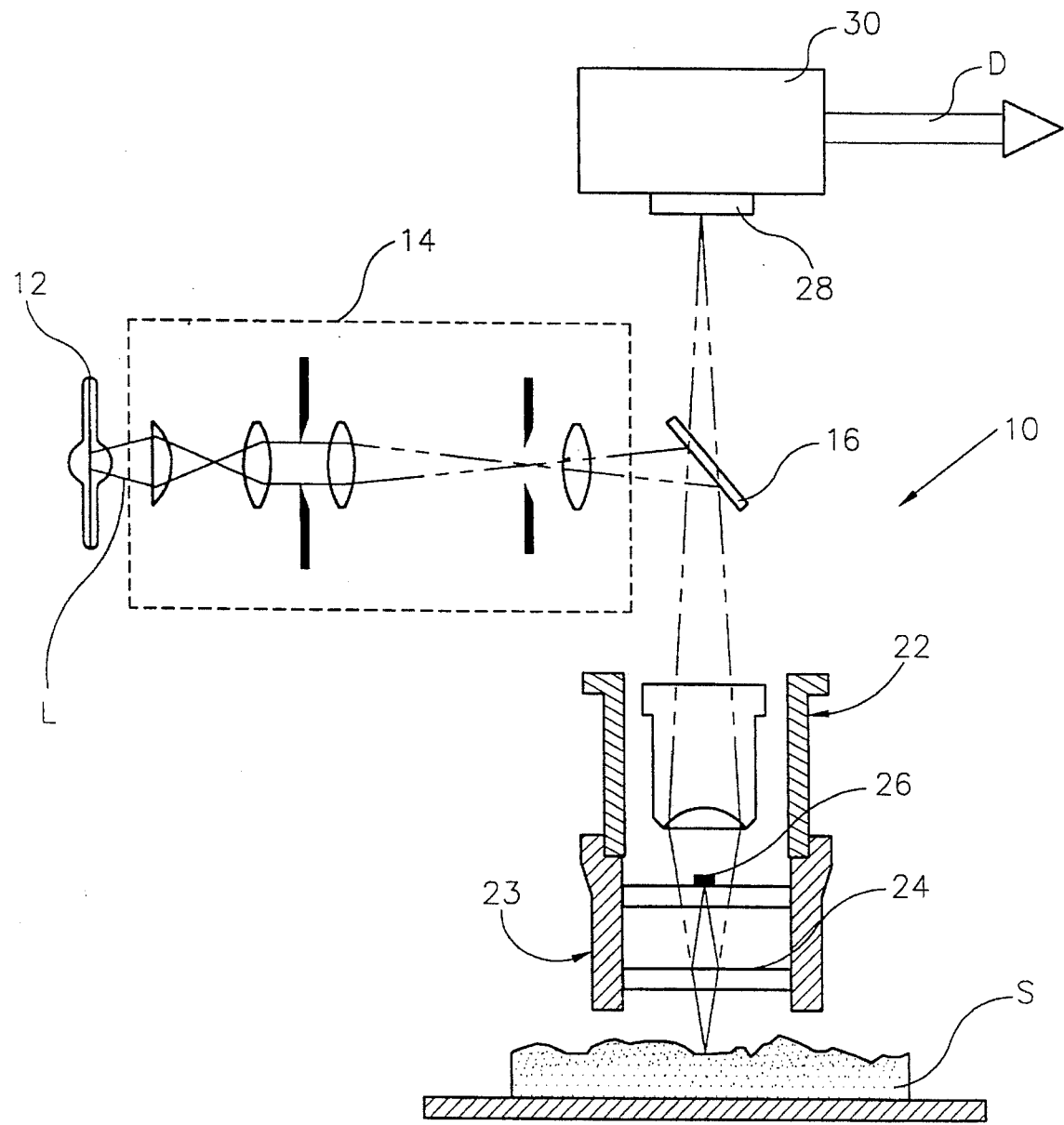
FIG. 1 is a simplified schematic representation of a conventional interference microscope.

The present invention consists of combining white-light vertical scanning with single-wavelength phase-shifting interferometric measurements. The result is a method of measuring steep surfaces and step heights in a test surface with higher vertical resolution and more vertical range than previously possible.

The invention is described with reference to x, y and z orthogonal coordinates wherein x and y define a horizontal plane and z defines a vertical direction, but it is obvious that the structure and operation of the features detailed in this specification can be rotated in any direction with equivalent results. It is also understood that the sizes of the various components shown in the drawings are not drawn to relative scale because of the very small dimensions of some features in comparison to others illustrated in the figures; therefore, they are represented only schematically for illustration.

Referring to the drawings, wherein like parts are designated throughout with like numerals and symbols, FIG. 1 illustrates in schematic view the basic configuration and mode of operation of a conventional interference microscope. The interferometer 10 comprises a light source 12 directing a beam L of light through an illuminator 14 toward a beam splitter 16, which reflects the light downward in the direction of a test surface S. The light reflected by the beam splitter 16 passes through a microscope objective 22 focused on the test surface S. The objective incorporates an interferometer 23, such as Mirau, comprising a beam splitter 24 and a reference mirror 26 adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 22 and upward through the beam splitter 16 to a solid-state detector array 28 in a camera 30 in coaxial alignment with the objective 22. Typically, the detector array 28 consists of individual CCD cells or other sensing apparatus adapted to produce a two-dimensional array of digitized intensity data D corresponding to light signals received at each sensor cell as a result of the interference of the coherent light beams reflected from individual x-y coordinates or pixels in the surface S and from corresponding coordinates in the reference mirror 26. Appropriate electronic hardware (not shown) is provided to transmit the digitized intensity data D generated by the detector to a microprocessor for processing. The microscope objective 22, as well as the interferometer typically incorporated within it, is adapted for vertical movement to focus the image of the test surface on the detector array 28.

In theory, the apparatus of FIG. 1 can be used to carry out VSI as well as PSI measurements, depending on the type of light emitted by the source 12. In practice, though, no instrument exists that is suitable for carrying out both measurements because the two procedures have heretofore been considered distinct and directed at different types of applications. Accordingly, the piezoelectric means typically used for varying the optical path difference and the software used to control the collection and processing of the light-intensity data are tailored to the specific objectives and requirements of each procedure. In the case of white-light vertical scanning interferometry, the main concerns are maximizing the range and linearity of the vertical scanning mechanism and improving the resolution of the measurements. In phase-shifting interferometry, the principal concern is the elimination of $2\pi$ phase ambiguities. Therefore, every instrument designed and manufactured to carry out either procedure is never adapted to perform both, although such adaptation can be readily achieved with great advantages once the rationale for its desirability is understood. This rationale is the heart of this invention.

Figure 2:
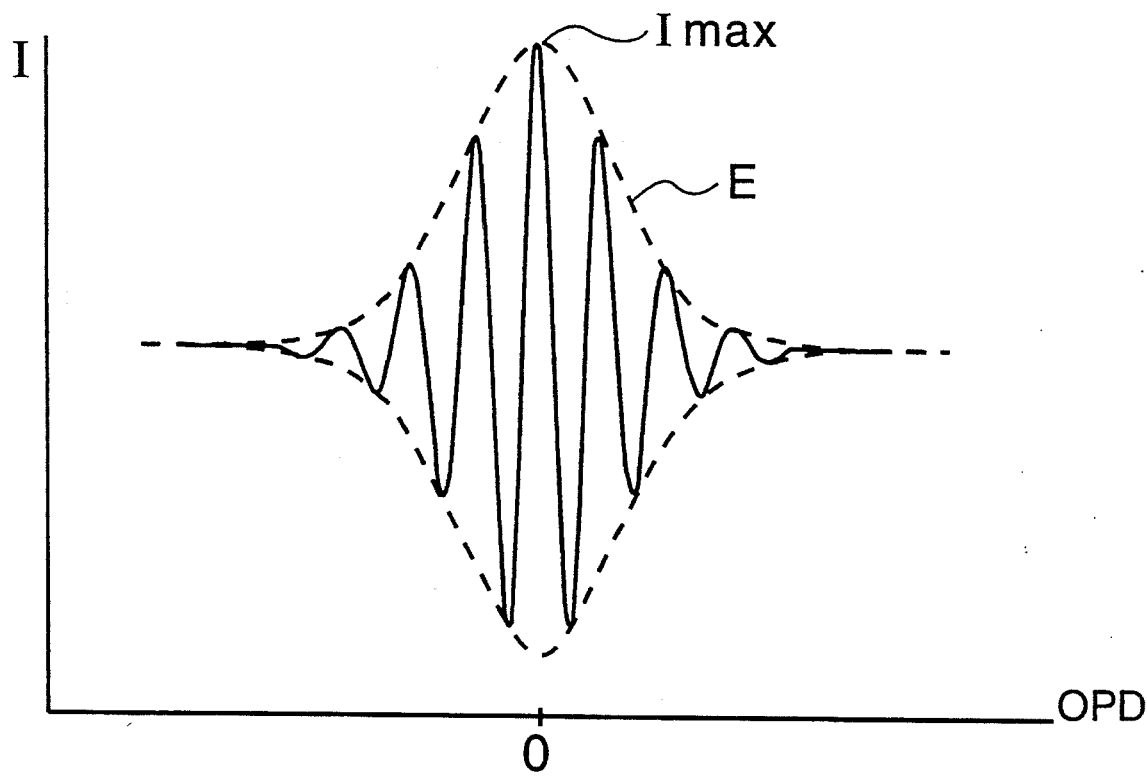
FIG. 2 is a typical intensity signal obtained from a detector cell in the image plane of an interferometer as the OPD is varied by vertically scanning the reference mirror or the test sample.

When white light is used as the source of illumination in an interference microscope, the modulation, or visibility of the fringes drops off rapidly from its maximum value $I_{MAX}$ at minimum OPD. FIG. 2 shows a typical intensity signal (irradiance, I) obtained from a detector cell in the image plane of the interferometer as the OPD is varied by vertically scanning the reference mirror (or the sample). According to one mode of implementing vertical-scanning interferometry, a measurement of relative surface height at the vertical-scanning point corresponding to the intensity-signal peak can thus be made. See Caber, P. et al. in "A New Interferometric Profiler for Smooth and Rough Surfaces," Proc. SPIE, Vol. 2088, 195–203, 1993, hereby incorporated by reference). By simultaneously carrying out the procedure in parallel for each detector cell (or by repeating it for each pixel), a three-dimensional surface map can be obtained for the test sample. Because the signal is inherently non-periodic for white-light sources, this procedure is not subject to the ambiguity problems that affect phase-shifting measuring methods.

In order to retrieve the signal of interest, the amplitude-modulated signal of FIG. 2 is demodulated using one of several techniques well known in the art. For example, amplitude demodulation by envelope detection can be implemented using simple filtering techniques in high-speed digital hardware. The detector array receives an amplitude-modulated input signal for the light intensity I given by:

$$I(z)=I_0+m(z)\cos(\omega_0 z+\alpha), \tag{2}$$

where I(z) is the light intensity at the detector, m(z) is the modulating signal, $\omega_0$ is the fringe signal, and $\alpha$ is the initial phase, which is assumed constant with respect to the vertical dimension z. From this relationship, VSI measurements make it possible to generate a height map for the surface of the test sample S. For example, as detailed in the referenced Caber article, the irradiance signal I(z) is first sampled at fixed intervals as the OPD (i.e., the vertical position z) is varied by a continuous translation of the vertical axis through focus, (typical sampling intervals can range from 50 nm to 100 nm). This is accomplished by a movement of either the test sample S or the reference mirror 26 and related optics (see FIG. 1) by means of a linearized translator (piezoelectric or motorized, as disclosed in the referenced copending application). Low frequency components are first removed from the irradiance signal by a filtering operation, such as by highpass or bandpass filtering, or by taking a first-order derivative of the signal. As detailed in the referenced article, such operation may be carried out by subtracting the previous light intensity value $I(z_{n-1})$ from the current one, $I(z_n)$, resulting in a signal of the form $$I'(z)=I(z_n)-I(z_{n-1}). \qquad (3)$$

Assuming m(z) to be relatively constant over the sampling interval, gives $$I'(z) = \qquad (4)$$

$$-2m(z)\sin\left(\frac{\omega_o(z_n - z_{n-1})}{2}\right)\sin\left(\frac{\omega_o(z_n + z_{n-1})}{2} + \alpha\right).$$

Using a constant sampling interval $\Delta z$ results in $$I'(z) = -2m(z)\sin\left(\frac{\omega_o\Delta z}{2}\right)\sin\left(\omega_o z + \frac{\omega_o\Delta z}{2} + \alpha\right), \qquad (5)$$

or $$I'(z) = A(z)\sin(\omega_o z + B), \qquad (6)$$

which is a signal of the same frequency as the original, with a new initial phase B and amplitude A determined by the sampling interval $\Delta z$. The amplitude of the signal is also maximized at a sampling interval $\Delta z = \pi$.

The signal is then rectified by one of several methods, such as by performing an absolute value or squaring operation of the signal I'(z), referred to in the art as square-law detection, as follows $$I'^2(z) = (\tfrac{1}{2})A^2(z) - (\tfrac{1}{2})A^2(z)\cos(2\omega_o z + 2B) \qquad (7)$$

This operation causes a shift in the frequency components of the carrier signal by a factor of two in the frequency domain, while the modulating signal becomes centered about zero. The frequency components of the modulating signal are then separated from those of the carrier signal by a lowpass digital filtering operation. As those skilled in the art readily understand, in order not to violate the Nyquist theorem, $\Delta z$ is chosen such that the signal is not undersampled. This condition requires a sampling frequency, $\omega_s$, greater than twice the highest frequency in the spectrum, or $$\omega_s \geq 4\omega_o 4BW \qquad (8)$$

where BW is the bandwidth of the modulating signal A(z).

Figure 3:
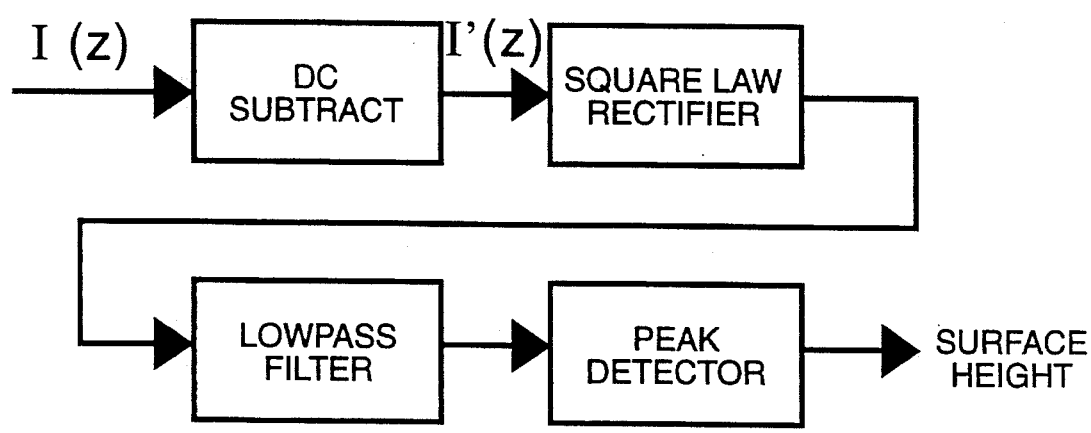
FIG. 3 is a block diagram of a data processing procedure suitable for performing vertical scanning interferometric measurements according to the present invention.

Finally, the peak of the lowpass filter output is located and the vertical position that corresponds to the peak is recorded. In order to increase the resolution of the measurement beyond the sampling interval, some form of interpolation between sample points is used, such as a curve-fitting operation performed on multiple points around the peak. A block diagram of this procedure is illustrated in FIG. 3.

Note that the procedure just described is only one of several approaches for white-light scanning interferometry. For a more complete description of the prior art, see Kino, Gordon S. et al "Mirau Correlation Microscope," Applied Optics 29(26):3775–3783, 1990; de Groot Peter and L. Deck, "Three-Dimensional Imaging by Sub-Nyquist Sampling of White-Light Interferograms," Optics Letters, 18(17):1462–1464, 1993; Danielson Bruce L. et al., "Absolute Optical Ranging Using Low Coherence Interferometry," Applied Optics, 30(21):2975–2979, 1991; Dresel, Thomas et al., "Three-Dimensional Sensing of Rough Surfaces by Coherence Radar," Applied Optics, 31(7):919–925, 1992; and Davidson, Mark et al., "First Results of a Product Utilizing Coherence Probe Imaging for Wafer Inspection," SPIE Vol 921, 100–114, 1988; which are all hereby incorporated by reference.

Figure 4A:
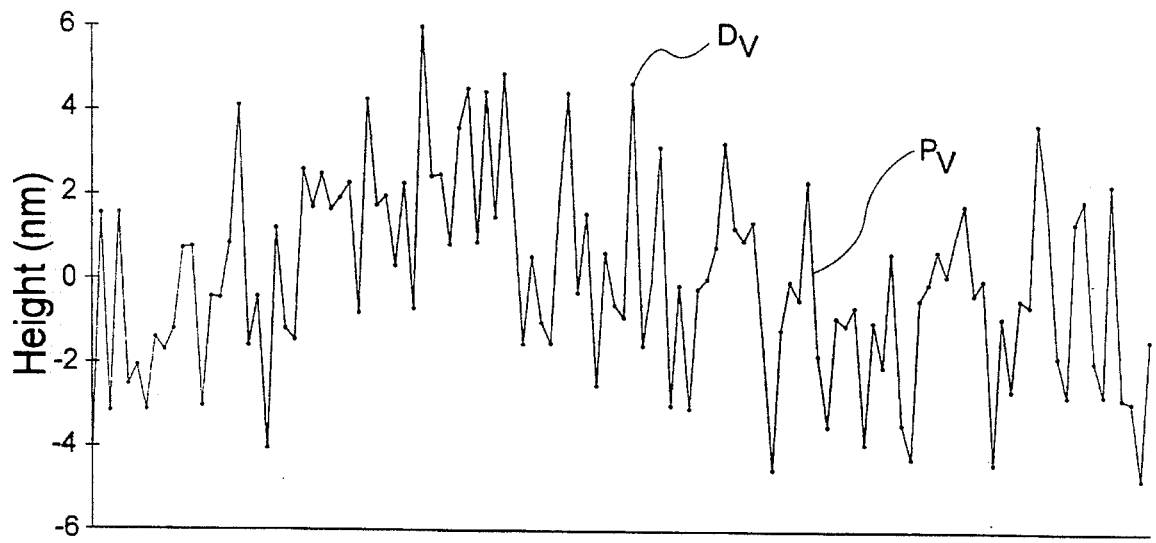
FIGS. 4a and 4b are an illustration of a surface profile calculated from VSI data for a smooth test sample.
Figure 4B:
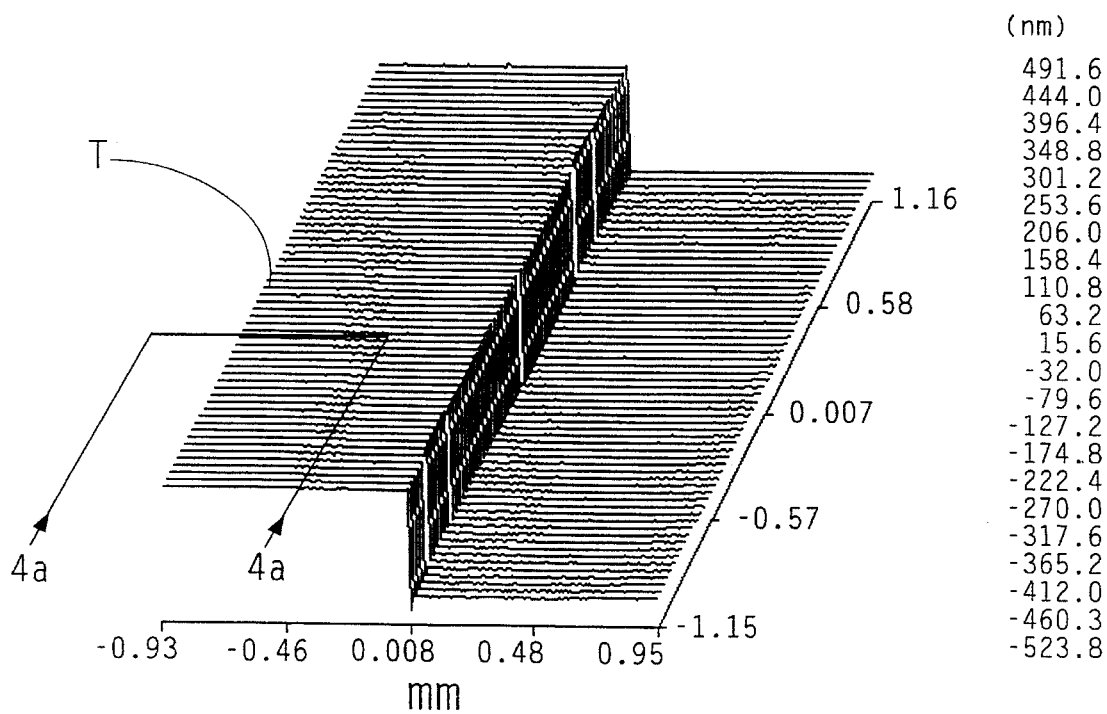

This vertical-scanning measurement technique results in a surface height resolution of approximately 2 nm rms on a smooth, highly reflective sample and can be performed over the height range provided by the vertical translator mechanism free of error from phase ambiguity. Thus, in theory a profile of a surface having steep gradients or a large step between adjacent pixels (i.e., an inter-pixel height difference greater than about 150 nm) can be generated with a precision within the resolution of the VSI instrument. However, in practice the measured height at each pixel is determined by the signal obtained from a position encoder, such as a linear variable differential transformer (LVDT). Therefore, the accuracy of the encoder also affects the resolution of the VSI procedure. FIG. 4a is an illustration of a two-dimensional profile $P_v$ generated from VSI data $D_v$ for a tested sample S. The profile is taken along a horizontal cross-section of the top portion T of a stepped surface, as seen in FIG. 4b. The roughness of the measured profile of FIG. 4a illustrates the measurement error due to resolution limitations and noise. The ordinate represents a height measurement in nanometers with reference to an arbitrary baseline (z=0) and is shown in a scale of approximately 2 nm to illustrate the level of resolution of the instrument. The abscissa represents various pixels corresponding to horizontal positions on the surface of the sample along its x profile $P_A$. As described below, by combining this procedure with phase-shifting measurements according to the present invention, the resolution can be extended to less than 0.2 nm rms for each measurement.

The idea of this invention is to perform phase-shifting measurements on the sample S while it is positioned on the same instrument, such that the height data so produced may be directly correlated to the height data produced by the VSI procedure. Using single-wavelength light (in practice, narrow-bandwidth or quasi-monochromatic light of central wavelength $\lambda_0$ is produced by a laser or by filtering a white-light source), at least three intensity frames of data are taken as the translator is moved a distance of $\pi/2$ (or $\lambda_0/8$) between each frame. Once the phase is determined from the intensity data, the surface height with the resolution afforded by the phase-shifting procedure (in the order of 0.2 nm) can be calculated using Equation (1). The data must then be integrated vertically, as those skilled in the art readily understand, to remove $2\pi$ ambiguities. If the surface is known to be smooth and continuous, such that integration errors are not introduced by the PSI procedure, the resulting data can be used directly to generate a surface map. Otherwise, the PSI data are combined with the VSI data to generate corrected integrated phase and height maps with the same resolution of the phase-shifting procedure (that is, about 0.2 nm).

Figure 5:
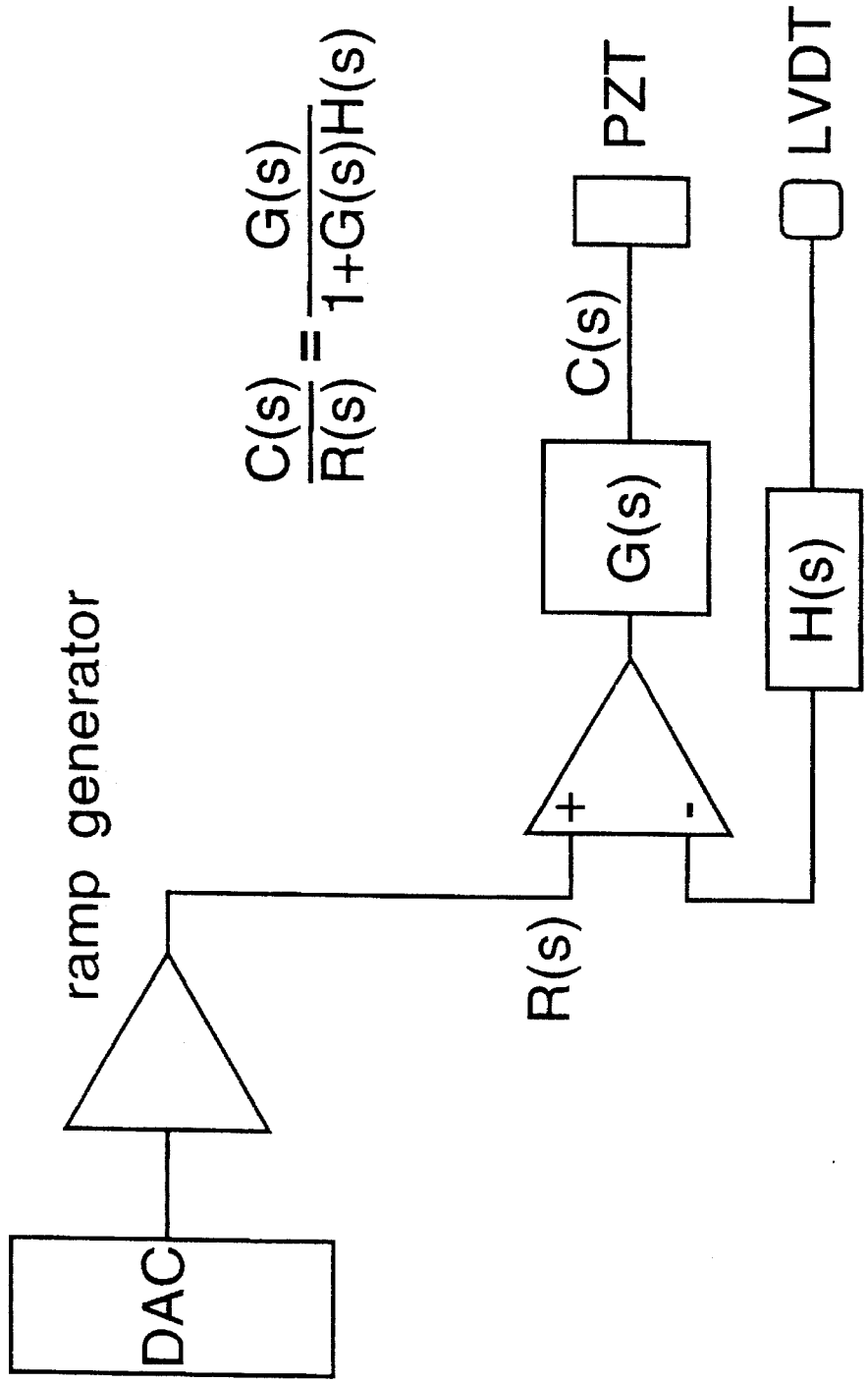
FIG. 5 is a block diagram of a closed-loop feedback control circuit used to ensure constant speed of motion of the translator mechanism used to perform phase shifting measurements.

As in all PSI procedures, the motion of the translator (PZT or motorized) must be controlled so that constant-speed translation over the entire range is obtained to ensure accurate measurements. This may be done by means of a linear variable differential transformer (LVDT) position encoder in a closed-loop servo-feedback configuration, as illustrated schematically in FIG. 5. If the gain and circuitry are carefully optimized, the time linearity of the translation motion can be improved by several orders of magnitude, thus materially improving the accuracy and repeatability of the measurements.

Figure 6:
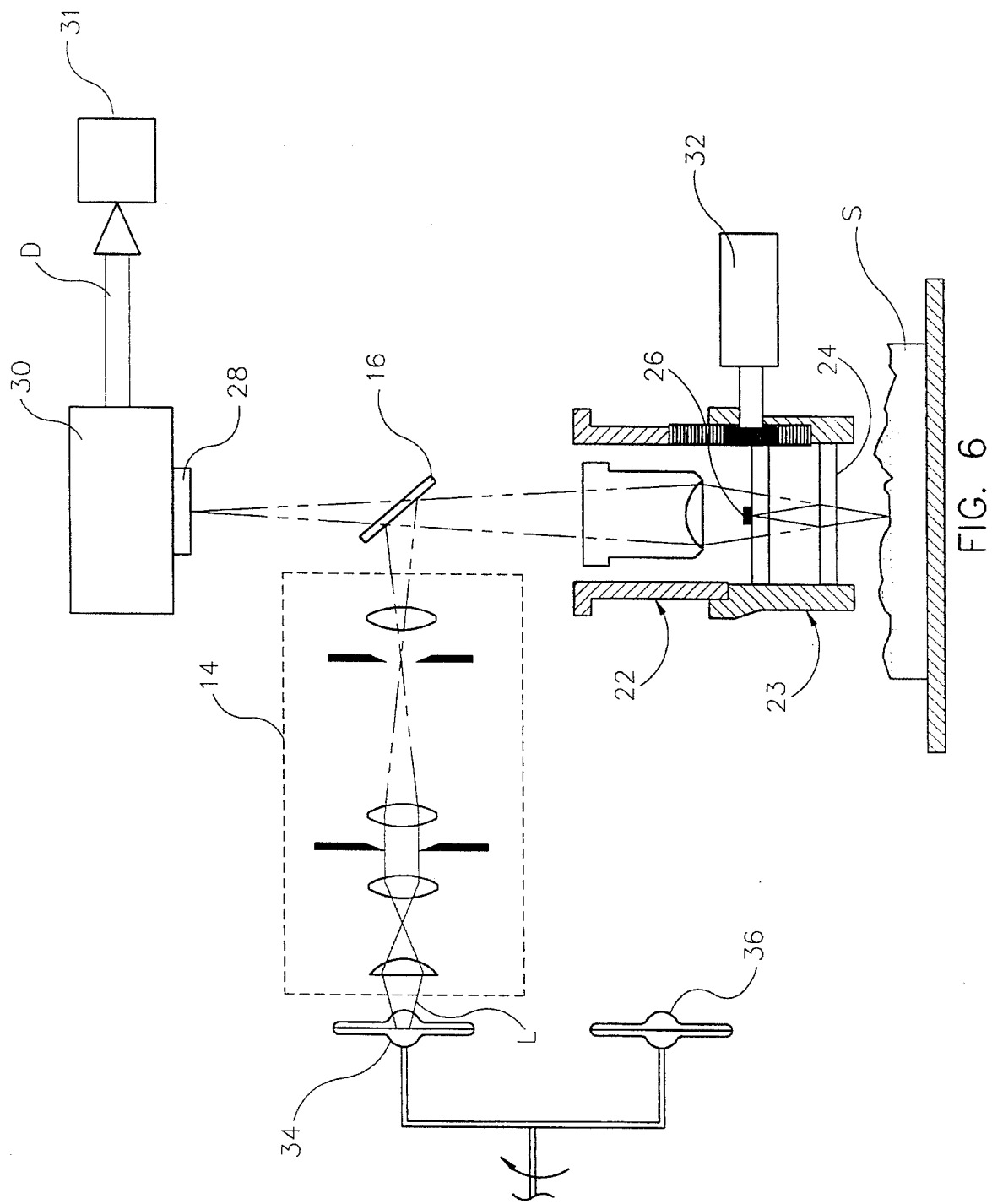
FIG. 6 is a schematic representation of a dual-mode, vertical-scanning and phase-shifting, interference microscope according to the present invention, wherein alternative white-light and single-wavelength sources are provided in the same instrument.
Figure 7:
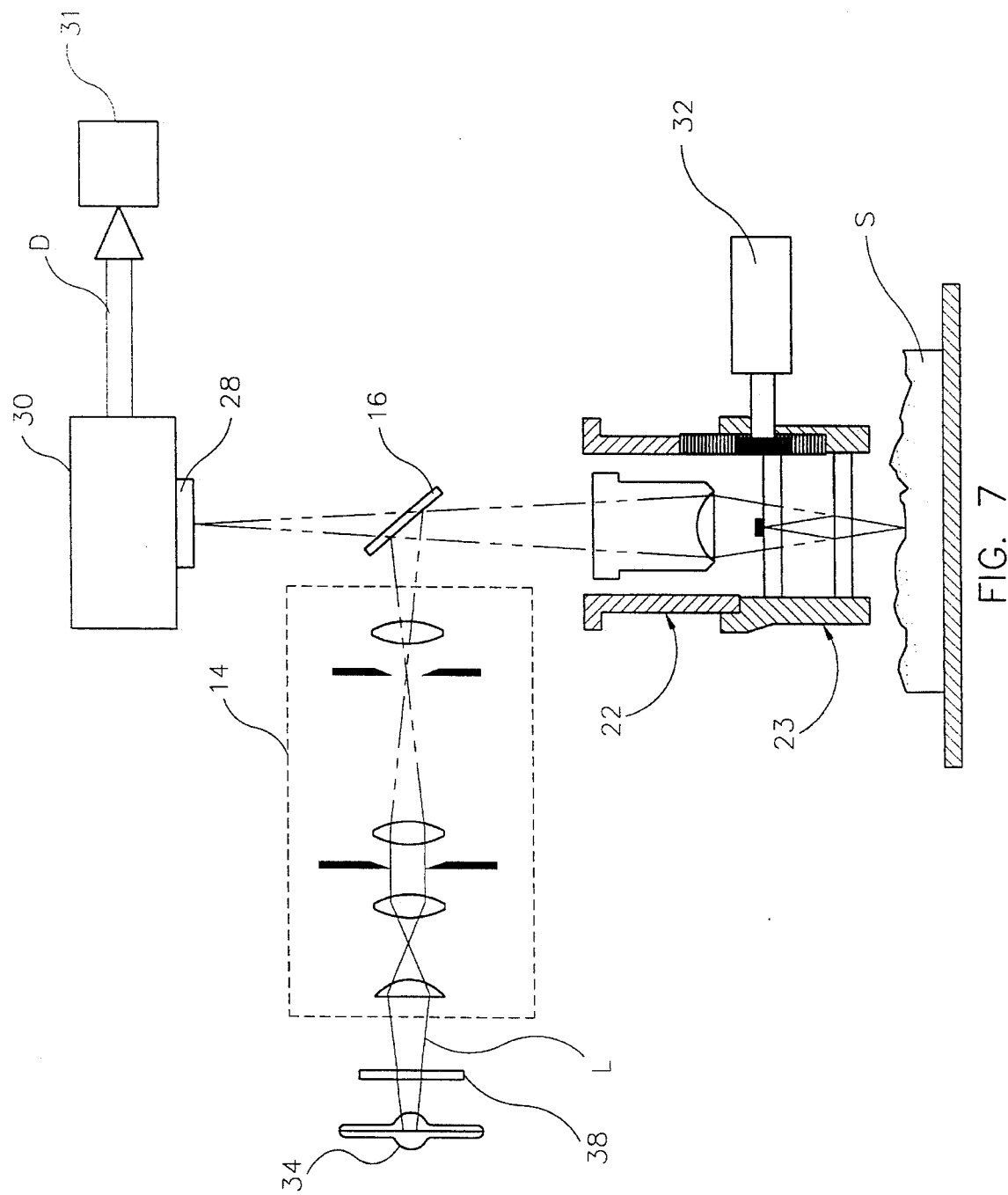
FIG. 7 is a schematic representation of a dual-mode interference microscope comprising a white-light source and a narrowband filter for alternative illumination with white light or single-wavelength light.
Figure 8:
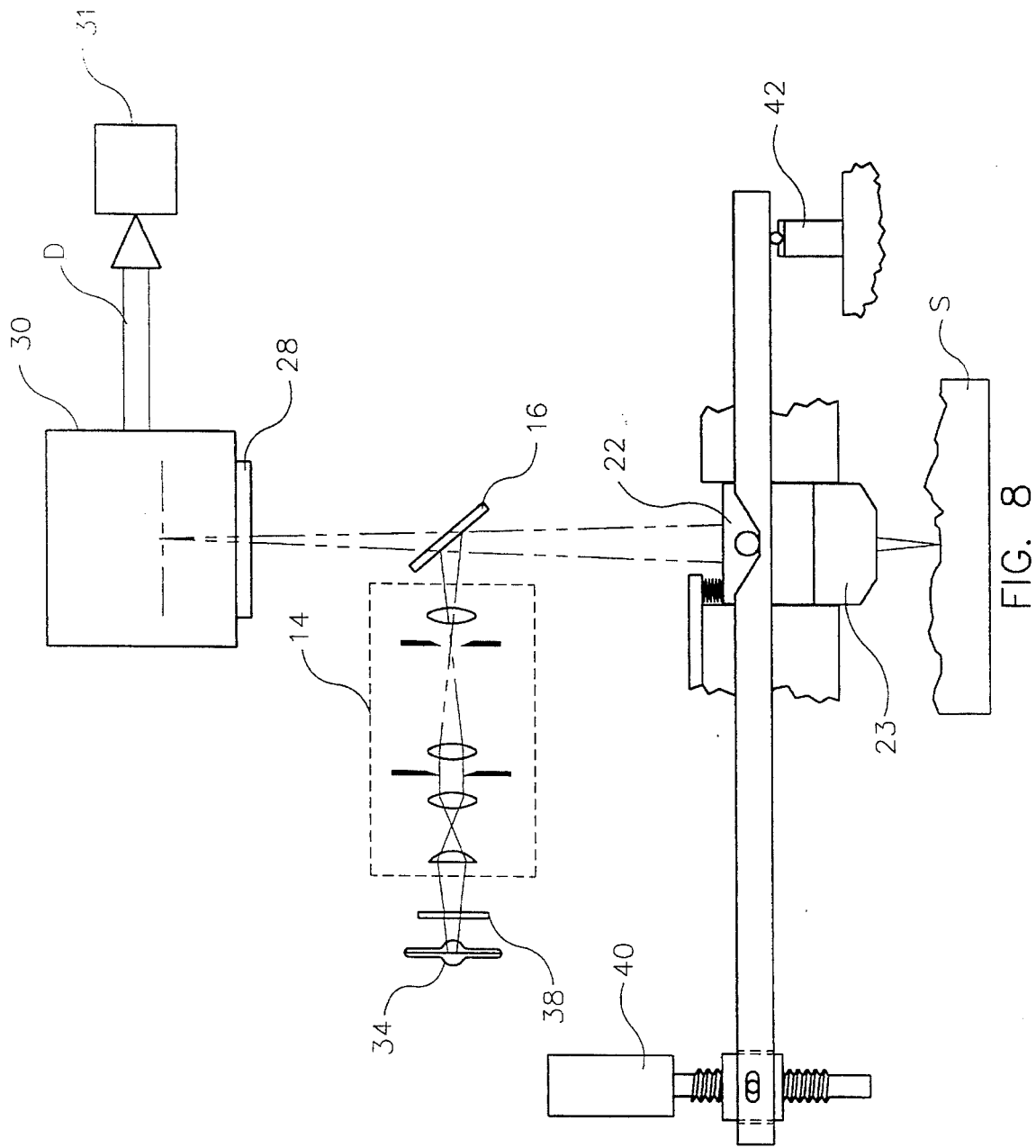

Thus, the technique of this invention requires interferometric apparatus that incorporates means for producing white light and, alternatively, single-wavelength light, as illustrated schematically in FIG. 6. The same optics 22, interferometer 23 and translator 32 (shown as a motorized embodiment thereof) are utilized to carry out both vertical-scanning and phase-shifting measurements. During VSI, a white-light source 34 is activated; during PSI, the instrument is switched to a single-wavelength or narrow-bandwidth source 36 adapted for alternative use. Note that a quasi-monochromatic light can be produced with equivalent function by a narrowband filter 38 in combination with a single white-light source 34, as illustrated in FIG. 7. Note also that the concept of this invention is perfectly suitable for incorporation with any of the motorized-scanner embodiments disclosed in copending application Ser. No. 08/235,108. FIG. 8 shows a white-light source 34 in combination with a narrowband filter 38 in an instrument adapted for vertical scanning over a very large range (at least 500 microns) by utilizing a motorized lever-arm translator 40 which also includes a piezoelectric element 42 for shorter range, phase-shifting measurements.

Figure 10A:
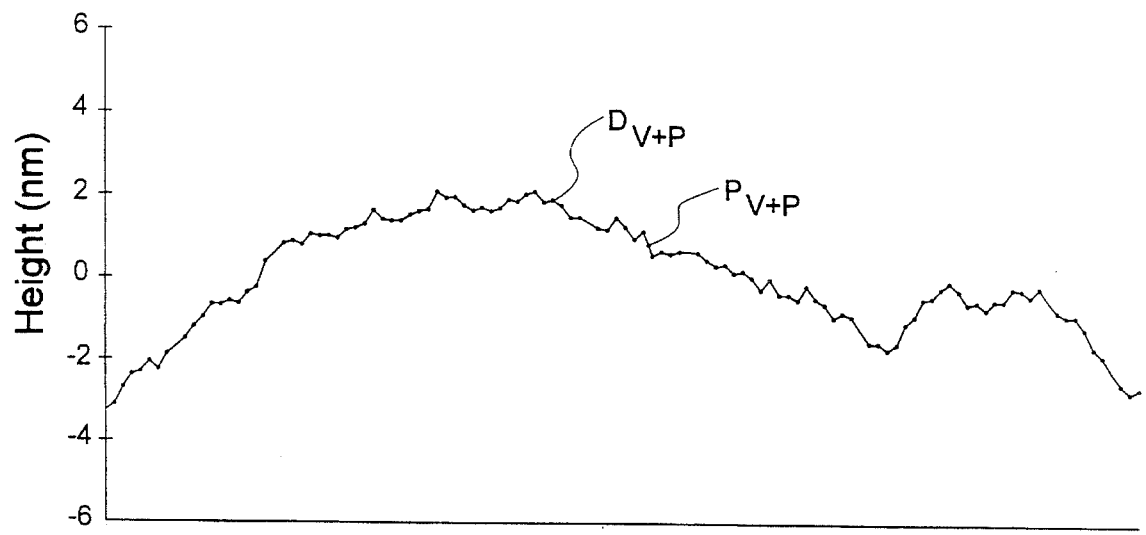
FIGS. 10a and 10b give an illustration of a surface profile calculated from the VSI plus PSI procedure of the present invention for the smooth test sample of FIGS. 4a and 4b.
Figure 10B:
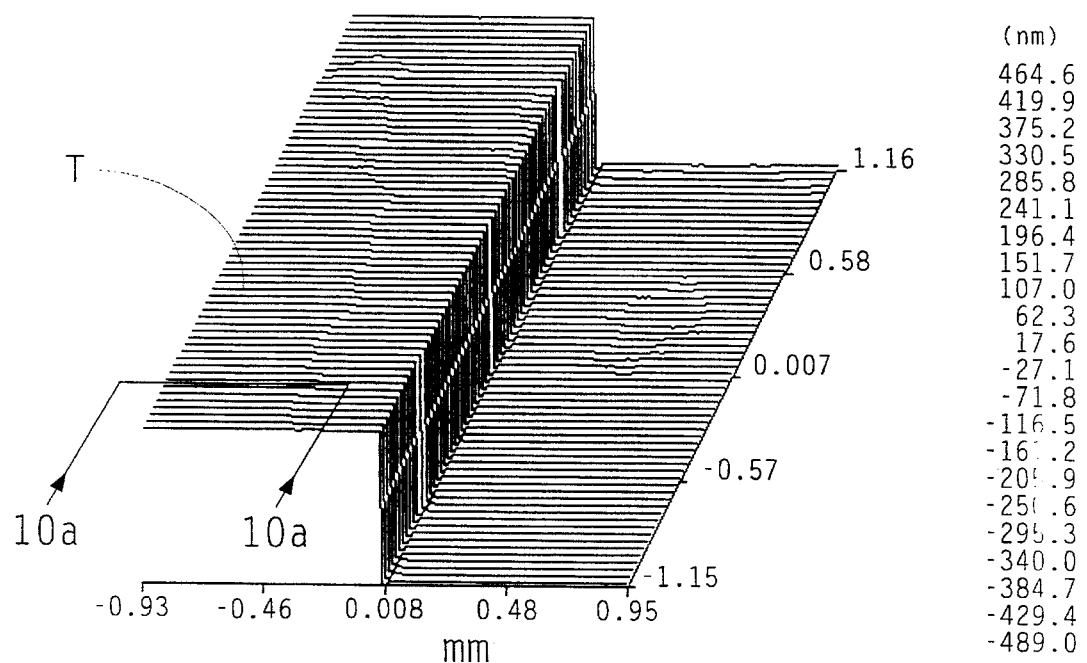

Thus, as illustrated in FIG. 9, the interferometric technique of this invention involves the following steps. First, a coarse-height map $h_{VSI}(x,y)$ of a test surface is generated by VSI measurements. Second, a fine-height map $h_{PSI}(x,y)$ map of the surface is generated by PSI measurements, using raw phase data, $\phi_{PSI}(x,y)$, uncorrected for $2\pi$ ambiguities. Third, the raw phase data $\phi_{PSI}(x,y)$ are integrated vertically using integration means 31 to produce an integrated fine-height map $h_{VSI+PSI}(x,y)$. These integrated data are generated by adding (or subtracting) $2\pi$ to (or from) the raw phase data and systematically checking the corresponding height value against the value in the coarse-height map $h_{VSI}(x,y)$ to ensure that the integrated fine-height and the coarse-height data are within one quarter of a wavelength (or $\pi$ for phase data) of each other for each pixel. If not, the heights of the pixels that do not satisfy this criterion are changed by increments of one half wavelength (or $2\pi$ for phase data) until the requirement is satisfied, which ensures the elimination of $2\pi$ ambiguities from the data. Thus, the fine-height map so obtained is not only free of phase ambiguities, but is also accurate to within the resolution of the PSI procedure. FIGS. 10a and 10b are an illustration of a profile $P_{V+P}$ generated from data points $D_{V+P}$ obtained from the combined VSI plus PSI procedure of the invention for the surface shown in FIG. 4. A comparison with FIG. 4 illustrates the greatly-reduced measurement error that results from the much finer resolution of the PSI procedure.

The value of the combined VSI plus PSI procedure lies in many distinct advantages over the prior art. The resulting fine-resolution heights are calculated free of phase ambiguity regardless of surface gradient or height steps. Subject to depth-of-focus and coherence-length limitations, the procedure can be carried our without theoretical limitations in the maximum size of the measurable gradient and/or step; and, most importantly, both measurements (VSI and PSI) are carried out in the same instrument without any need for recalibrating or otherwise adjusting the optics of the apparatus between measurements. Therefore, depending on what the nature of the surface being measured warrants, only VSI or PSI, or combined measurements may be performed to profile the test surface to the degree of precision desired under the circumstances. When the highest degree of accuracy is required for steep and/or discontinuous surfaces (defined as such by steps greater than a quarter of a wavelength), the combined procedure produces height maps with a resolution an order of magnitude better than conventional techniques (i.e., 0.2 nm versus 2.0 nm).

In order to yet improve the height measurements obtained by the combined procedure of the invention, it is desirable to perform a correction to the data to account for offsets resulting from physical shifts in the position of the sample between sets of measurements and from phase shifts that might occur while switching from white light to single-wavelength light. This problem is common to all techniques using two wavelengths, such as the one disclosed in the above-referenced U.S. Pat. No. 4,832,489. An approach to the solution of this problem utilized in the art has been to find the offset created by such shifts by comparing the height measured by the VSI and by the PSI procedures at a pixel for which good data are known to be available, as measured by predetermined criteria programmed into the processing software of the instrument. As understood by those skilled in the art, such an offset, referred to in the art as a "piston," may be viewed as the difference between the VSI and PSI heights (or vice versa) measured at that pixel. In order to improve the preciseness of the combined VSI/PSI measurements, the piston is added to the PSI data prior to vertical integration for each pixel, thus minimizing the error introduced by the change in light source. The corrected PSI data are then integrated to within one quarter wavelength (or $\pi/2$) of the VSI data to eliminate phase ambiguities, finally yielding a corrected set of fine-height data.

Figure 11:
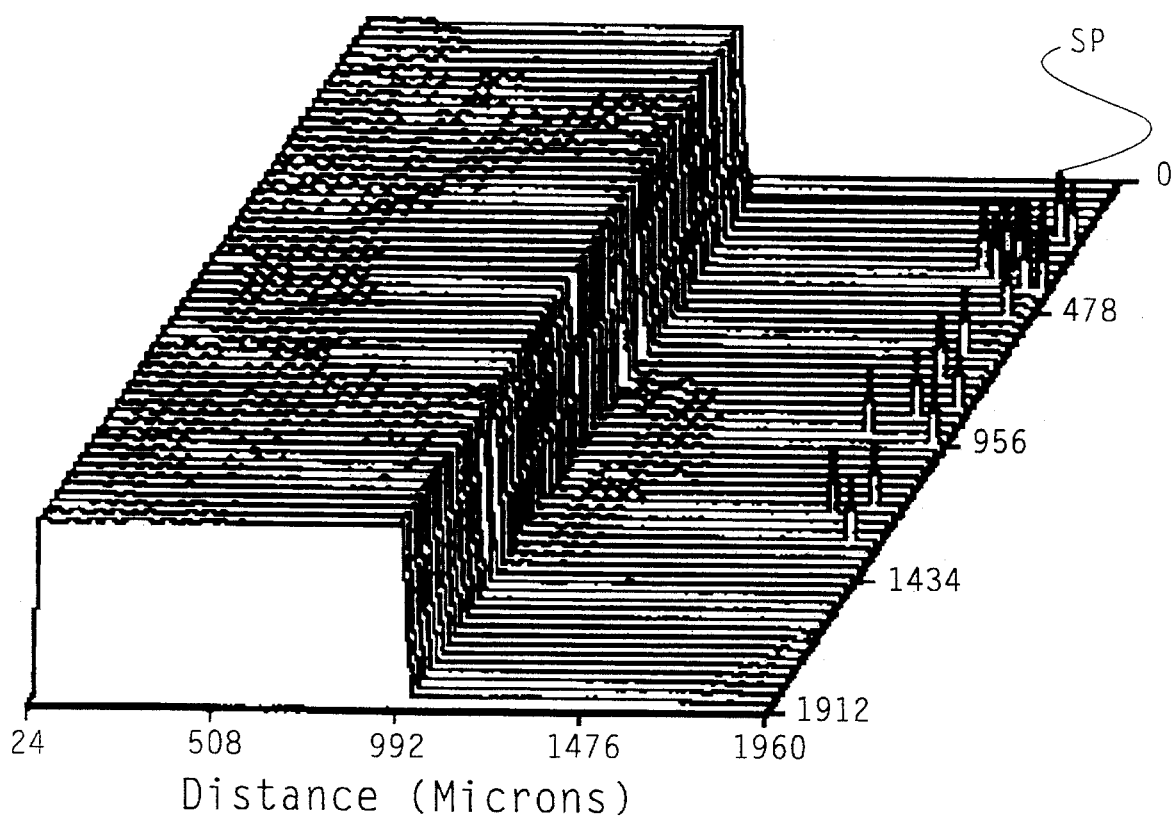
FIG. 11 is an illustration of random errors in the height data calculated using the technique of this invention when the offset between VSI and PSI measurements is determined with reference to a single pixel.
Figure 12:
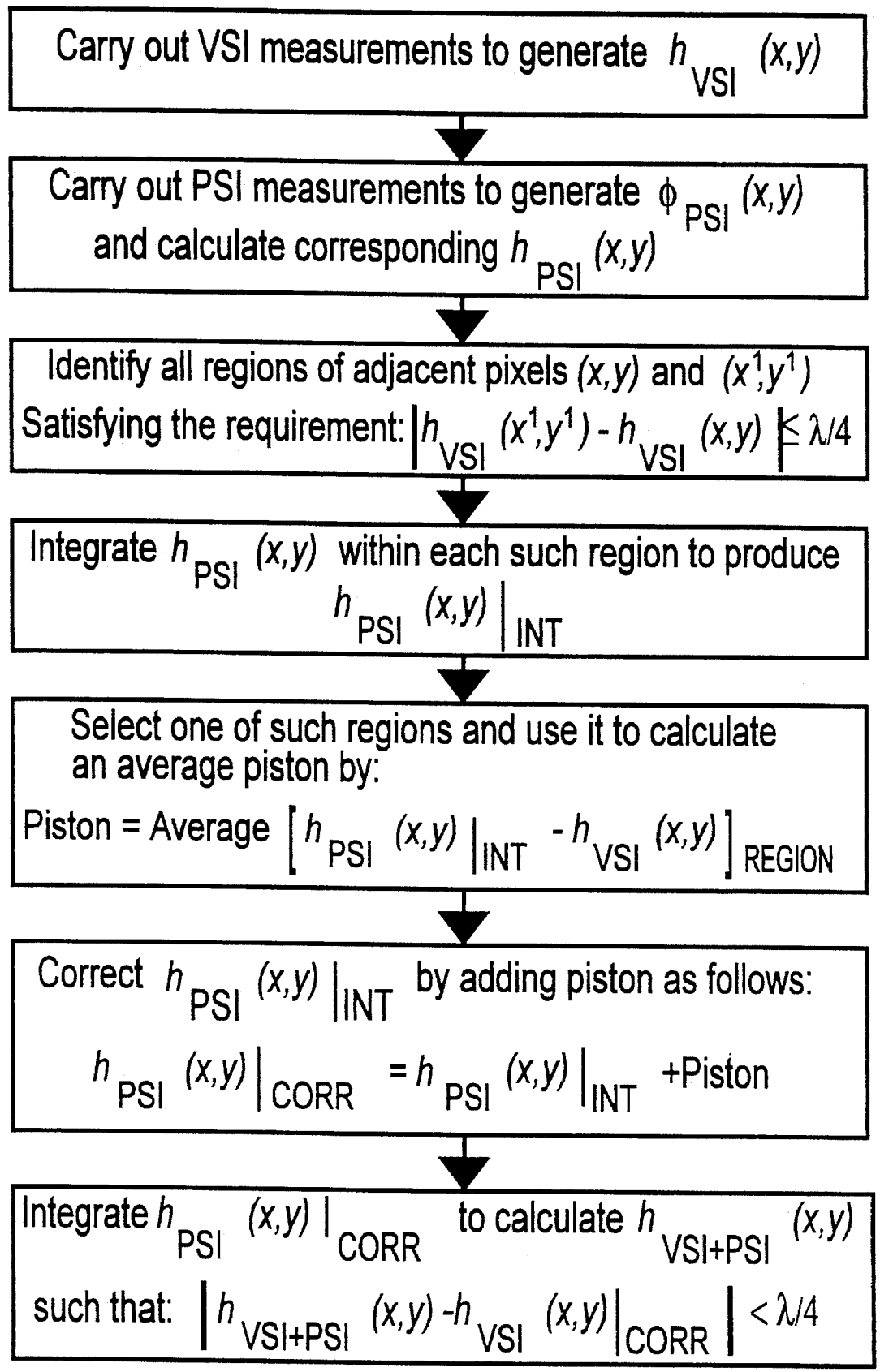
FIG. 12 is a block diagram of the method of the invention including steps for correcting the raw phase data produced by phase shifting.

Experience has shown that this procedure, which is based on a piston calculated from only one pixel, is prone to random error in the nature of isolated height spikes SP, as illustrated in FIG. 11. Therefore, an improved technique is disclosed here for minimizing these drawbacks. Instead of determining the piston (i.e., the shift in the z direction between VSI and PSI measurements) by reference to a single pixel, it is determined by reference to one region (a region being defined as a plurality of adjacent pixels) wherein the height difference between adjacent pixels is less than one quarter wavelength. That is, all adjacent pixels for which height data are known to be free of phase ambiguities are utilized to calculate an average piston. Normally, the largest such region is chosen so that a larger number of data is available for processing. For example, the piston can be calculated by averaging the difference between the VSI and PSI measurements at each pixel (i.e., an average of all pistons in the region), or by determining a piston between average VSI and PSI heights for all pixels in the region. This procedure has been found to be a marked improvement over the single-pixel piston approach and to produce very consistent and repeatable height measurements; therefore, it is highly recommended in conjunction with the combined VSI/PSI technique of the present invention. FIG. 12 illustrates the steps of the invention in block diagram form when the phase data are corrected by this approach.

Figure 13:
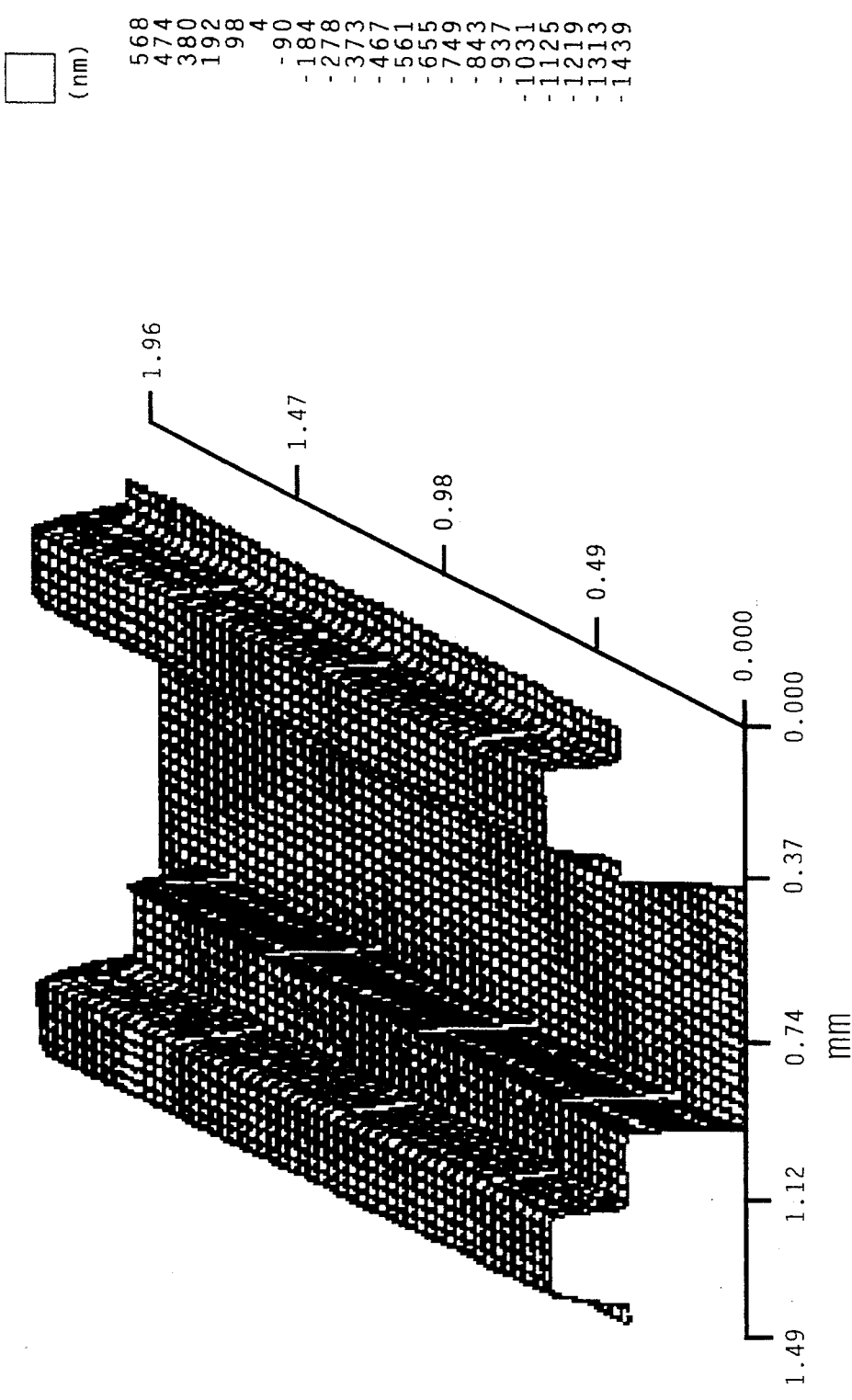
FIG. 13 is a three-dimensional profile of a stepped magnetic head generated using the dual-mode technique of the invention.

The technique of this invention is obviously most useful for steep surfaces and for surfaces having large height steps. Theoretically, the range of surface heights that can be profiled is limited only by the range of the piezoelectric or other translator used to perform the translation through focus. In practice, though, as those skilled in the art would readily understand, depth-of-focus and single-wavelength coherence-length considerations further limit the range of surface heights that can be profiled by this procedure. Advantages of this technique include high throughput, non-contact, and true three-dimensional profiling capabilities. Applications include the measurement of surface texture of metallic parts, glass, ceramics, rubber, paper, and plastic. A measurement of a stepped magnetic recording head using the combined VSI and PSI modes of the invention is shown in FIG. 13. The instrument is able to profile the step, which is typically in the 1 to 2 μm range, while at the same time retaining a vertical resolution of less than 0.2 nm for the smooth top region, known as the air bearing surface. These results demonstrate that the new technique disclosed herein of combining vertical-scanning and phase-shifting interferometry can provide the capability for profiling an extremely wide range of surface heights. The technique was shown to be accurate and repeatable, with good correlation between the two measurement modes.

The combined procedure of the invention is described in this disclosure in terms of white light and single-wavelength light techniques, but it is understood that these light sources could be equivalently described as broad-bandwidth and narrow-bandwidth lights. As those skilled in the art understand, a broad-bandwidth light having a coherence length approximately 6 μm or less is suitable for performing vertical scanning interferometry; similarly, any narrow-bandwidth light with a sufficiently identifiable central wavelength (such as, for example, 600 nm) is suitable for practicing phase-shifting interferometry.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of profiling a height of a test surface using apparatus adapted to alternatively execute broad-bandwidth scanning or phase-shifting interferometric measurements by illuminating the test surface and a reference arm aligned in an optical path to provide an interference pattern on an array of detector cells, comprising the following steps:

(a) using a broad-bandwidth light source to illuminate said test surface and reference arm while effecting a relative translation therebetween to produce a plurality of broad-bandwidth interference patterns on said detector cells, such that a coarse height for a region of said test surface corresponding to each detector cell is calculated by application of a scanning interferometric technique;

(b) using a narrow-bandwidth light source having a central wavelength to illuminate said test surface and reference arm while effecting a relative translation therebetween to produce a plurality of single-wavelength interference patterns on said detector cells, such that phase data comprising a phase and a fine height for said region of the test surface corresponding to each detector cell are calculated by application of a phase-shifting interferometric technique; and (c) integrating said phase data to produce a vertically-integrated fine height for each said region of the test surface by adding or subtracting multiples of one half of said central wavelength of said narrow-bandwidth light source to or from each said fine height calculated in step (b) for each detector cell, such that the difference between said vertically-integrated fine height and said coarse height is less than one quarter of the central wavelength.

2. The method of claim 1, wherein said step (b) is carried out by passing a light beam from said broad-bandwidth light source through a narrowband filter to produce a narrow-bandwidth light beam.

3. The method of claim 1, including the step of determining an offset between said coarse height and said fine height calculated for said region corresponding to each detector cell, said offset being determined with reference to one detector cell; and further including the step of adding said offset to the fine height measured for each said region of the test surface prior to performing the integration of step (c).

4. The method of claim 1, including the step of horizontally integrating said phase data to produce a horizontally-integrated fine height for each said region of the test surface by adding or subtracting multiples of one half of said central wavelength of said narrow-bandwidth light source to or from each said fine height calculated in step (b) for each detector cell, such that the difference between said horizontally-integrated fine height of each cell and the horizontally-integrated fine height of each cell adjacent thereto is less than one quarter of the central wavelength; further including the step of determining an offset between said coarse height and said horizontally-integrated fine height calculated for said region corresponding to each detector cell, said offset being determined with reference to a plurality of contiguous detector cells; and further including the step of adding said offset to the horizontally-integrated fine height measured for each said region of the test surface prior to performing the vertical integration of step (c).

5. The method of claim 4, wherein said plurality of contiguous detector cells is selected such that the difference between the coarse height corresponding to each cell and the coarse height corresponding to all cells adjacent thereto is less than one quarter of said central wavelength.

6. The method of claim 5, wherein said offset is determined by averaging individual offsets calculated for each of said plurality of contiguous detector cells as the difference between the coarse height and the horizontally-integrated fine height corresponding to each cell.

7. A method of profiling a height of a test surface using apparatus adapted to alternatively execute white-light vertical-scanning or phase-shifting interferometric measurements by illuminating the test surface and a reference arm aligned in an optical path to provide an interference pattern on an array of detector cells, comprising the following steps:

(a) using a white-light source to illuminate said test surface and reference arm while effecting a relative translation therebetween to produce a plurality of white-light interference patterns on said detector cells, such that a coarse height for a region of said test surface corresponding to each detector cell calculated by application of a vertical-scanning interferometric technique;

(b) using a substantially-monochromatic light source having a central wavelength to illuminate said test surface and reference arm while effecting a relative translation therebetween to produce a plurality of single-wavelength interference patterns on said detector cells, such that phase data comprising a phase and a fine height for said region of the test surface corresponding to each detector cell are calculated by application of a phase-shifting interferometric technique; and (c) integrating said phase data to produce a vertically-integrated fine height for each said region of the test surface by adding or subtracting multiples of one half of said central wavelength of said substantially-monochromatic light source to or from each said fine height calculated in step (b) for each detector cell, such that the difference between said vertically-integrated fine height and said coarse height is less than one quarter of the central wavelength.

8. The method of claim 7, wherein said step (b) is carried out by passing a light beam from said white-light source through a narrowband filter to produce a quasi-monochromatic light beam.

9. The method of claim 7, including the step of determining an offset between said coarse height and said fine height calculated for said region corresponding to each detector cell, said offst being determined with reference to one detector cell; and further including the step of adding said offset to the fine height measured for each said region of the test surface prior to performing the integration of step (c).

10. The method of claim 7, including the step of horizontally integrating said phase data to produce a horizontally-integrated fine height for each said region of the test surface by adding or subtracting multiples of one half of said central wavelength of said substantially-monochromatic light source to or from each said fine height calculated in step (b) for each detector cell, such that the difference between said horizontally-integrated fine height of each cell and the horizontally-integrated fine height of each cell adjacent thereto is less than one quarter of the central wavelength; further including the step of determining an offset between said coarse height and said horizontally-integrated fine height calculated for said region corresponding to each detector cell, said offset being determined with reference to a plurality of contiguous detector cells; and further including the step of adding said offset to the horizontally-integrated fine height measured for each said region of the test surface prior to performing the vertical integration of step (c).

11. The method of claim 10, wherein said plurality of contiguous detector cells is selected such that the difference between the coarse height corresponding to each cell and the coarse height corresponding to all cells adjacent thereto is less than one quarter of said central wavelength.

12. The method of claim 11, wherein said offset is determined by averaging individual offsets calculated for each of said plurality of contiguous detector cells as the difference between the coarse height and the horizontally-integrated fine height corresponding to each cell.

13. Apparatus for profiling a height of a test surface by executing white-light vertical-scanning and phase-shifting interferometric measurements in a single test instrument, said apparatus comprising, in combination:

(a) test-surface arm for holding the test surface;

(b) a reference mirror mounted on a reference arm positioned at a variable distance from said test surface;

(c) an array of light-intensity detectors disposed in an optical path with said test surface and reference mirror;

(d) means for varying the distance between said test surface and said reference mirror by predetermined amounts;

(e) means for emitting a white-light beam to illuminate both said reference mirror and test surface to provide white-light interference patterns on said array of light-intensity detectors as the distance between said test surface and reference mirror is varied according to a vertical-scanning interferometric technique;

(f) means for measuring a plurality of intensities of said white-light interference patterns as a result of vertical-scanning signals produced by said light-intensity detectors and for computing corresponding coarse height measurements for the test surface by application of said vertical-scanning interferometric technique, such that a coarse height for a region of said test surface corresponding to each light-intensity detector is calculated;

(g) means for emitting a quasi-monochromatic light beam having a central wavelength to illuminate both said reference mirror and test surface to provide single-wavelength interference patterns on said array of light-intensity detectors as the distance between said test surface and reference mirror is varied according to a phase-shifting interferometric technique;

(h) means for measuring a plurality of intensities of said single-wavelength interference patterns as a result of phase-shifting signals produced by said light-intensity detectors and for computing corresponding phase data comprising phase and fine height measurements for the test surface by application of said phase-shifting interferometric technique, such that a phase and a fine height for said region of the test surface corresponding to each light-intensity detector are calculated; and means for integrating said phase data to produce a vertically-integrated fine height for each said region of the test surface by adding or subtracting multiples of one half of said central wavelength of said quasi-monochromatic light to or from each said fine height, such that the difference between said vertically-integrated fine height and said coarse height is less than one quarter of the central wavelength.

14. The apparatus of claim 13, wherein said means for emitting a white-light beam and said means for emitting a quasi-monochromatic light beam consist of two separate light sources adapted for alternative utilization to produce white light or quasi-monochromatic light for said vertical-scanning or phase-shifting interferometric techniques, respectively.

15. The apparatus of claim 13, wherein said means for emitting a quasi-monochromatic light beam consist of a removable narrowband filter disposed in the path of a light beam produced by said means for emitting a white-light beam.

* * * * *

UNITED STATES PATENT AND TRADEMARK OFFICE
CERTIFICATE OF CORRECTION

PATENT NO. : 5,471,303
DATED : November 28, 1995
INVENTOR(S) : Chiayu Ai and Paul J. Caber It is certified that error appears in the above-indentified patent and that said Letters Patent is hereby corrected as shown below:

Col. 12,

In Claim 7, line 54, insert: --is-- after "cell"
Col. 14
In Claim 13, line 34, insert: --(i)-- before "means"

Signed and Sealed this

Twentieth Day of February, 1996

Attest:

BRUCE LEHMAN

Attesting Officer     Commissioner of Patents and Trademarks